(12) United States Patent
Grenning

(10) Patent No.: US 7,150,827 B1
(45) Date of Patent: Dec. 19, 2006

(54) DECHLORINATOR

(76) Inventor: Frederick H. Grenning, 1306 Crooked Willow La., Palatine, IL (US) 60067

( * ) Notice: Subject to any disclaimer, the term of this patent is extended or adjusted under 35 U.S.C. 154(b) by 79 days.

(21) Appl. No.: 10/679,156

(22) Filed: Oct. 3, 2003

(51) Int. Cl.
C02F 1/70 (2006.01)
(52) U.S. Cl. ........................ 210/205; 210/757
(58) Field of Classification Search ............... 210/192, 210/198.1, 206, 749, 757, 205; 137/268; 422/282
See application file for complete search history.

(56) References Cited

U.S. PATENT DOCUMENTS

| | | | | |
|---|---|---|---|---|
| 618,349 | A | * | 1/1899 | Heany .................. 4/226.1 |
| 1,205,513 | A | * | 11/1916 | Carlson ................ 422/278 |
| 4,250,910 | A | * | 2/1981 | King .................... 137/268 |
| 5,350,512 | A | | 9/1994 | Tang |
| 5,405,540 | A | | 4/1995 | Tang |
| 5,427,748 | A | * | 6/1995 | Wiedrich et al. ......... 422/284 |
| 6,138,703 | A | | 10/2000 | Ferguson et al. |
| 6,221,257 | B1 | | 4/2001 | Grim |
| 6,264,846 | B1 | | 7/2001 | Smith |
| 6,298,871 | B1 | | 10/2001 | Pickens et al. |

FOREIGN PATENT DOCUMENTS

JP 2000176442 A * 6/2000

* cited by examiner

*Primary Examiner*—Matthew O. Savage
(74) *Attorney, Agent, or Firm*—Gerhardt Gomez & Haskins, LLP

(57) ABSTRACT

A portable apparatus for adding a dechlorination agent into a fluid stream prior to discharge and a method for treatment of chlorinated water. The portable apparatus can connect in any part of a fluid flow system. A bypass is provided such that a controlled portion of the fluid stream is diverted to a dechlorination agent. The dechlorination agent dissolves in the bypassed fluid flow. The bypassed, dechlorination agent enriched fluid re-enters and mixes with the fluid flow that was not bypassed. As the two streams mix, the total flow receives the required amount of dechlorination before being discharged into the environment. A valve controls proportional flow of the fluid stream through the bypass.

2 Claims, 4 Drawing Sheets

DECHLORINATOR

The present invention relates generally to the field of chemical injection devices. More specifically, the present invention relates to a method and apparatus for injecting a dechlorination agent into a stream of fluid before the fluid is discharged to the environment.

BACKGROUND OF THE INVENTION

Typically, chlorine is added to a city's water supply to kill pathogens that are harmful to humans. Once the pathogens are killed, the water is fit for human consumption.

However, not all water is consumed. City water supply systems are routinely flushed and flow tested to remove debris from the water mains and to determine water availability for fire fighting. Fire pumps that are used to boost the water supply of fire sprinkler systems are flow tested annually as an insurance requirement and/or local fire code requirement. In all of these cases large amounts of chlorinated water are discharged to storm sewers back into the environment or into a waste-stream. Because chlorine is toxic to aquatic life, before the water can be discharged, it must be dechlorinated, making it safe for the environment. The Federal Clean Water Act ("CWA") prohibits the discharging of water that contains toxic pollutants, including chlorine, in toxic amounts. The U.S. Environmental Protection Agency ("USEPA") establishes the allowable levels of pollutants. Other state and local jurisdictions may provide additional restrictions. Enforcement includes fines and possible incarceration.

Dechlorination can be accomplished by adding to the discharging water, absorbic acid, sodium sulfite, sodium bisulphate or any other chemical that reacts with chlorine ions in such a way that the fluid is no longer toxic to aquatic life, or meets otherwise required standards for discharge.

Typically, dechorination agents are added to a basin containing chlorinated water. However, in many situations, a basin is not provided, or would be impractical due to size, portability and locality. In these cases the dechlorination agent must be added to the chlorinated stream before the stream is discharged into the environment. Therefore, a device that does not require a basin for adding a dechlorination agent would be beneficial for locations where a basin is undesirable or impracticable.

A portable system is extremely advantageous for discharging chlorinated water where a permanent or semi-permanent dechlorinating operation is not desired. This includes situations such as draining a system, testing fire pumps, and discharging water from a fire-main whether as a one-time, infrequent, or even frequent event.

Where local regulations require dechlorination, the above tasks would normally require the water to be collected, transported offsite, and treated elsewhere, all at a great expense. Failure to comply could result in fines, and in some cases, criminal charges, not to mention the adverse affects to aquatic life and groundwater supplies that will occur if the water is not properly treated.

A dechlorination device that does not require a basin, is portable, temporary, and controllable, would save costs, time, effort, and prevent possible regulatory action against the discharger of chlorinated water would be beneficial. Such a device is the subject of the current invention.

U.S. Pat. No. 5,405,540 to Tang, issued on Apr. 11, 1995, discloses a method for treatment of wastewater. The apparatus is a combination chlorinator and dechlorinator. Chlorinated water washes over dechlorinating tablets. The dechlorinating tablet container is partially submerged in a contact tank. Unlike the present invention, a tank is required. Hence, the Tang invention is not portable and could not be transported by one individual to a site for operation. In addition, the Tang invention does not allow for an operator to set the proportional flow rate across the tablets as the present invention does. Also, the present invention can be completely valved off such that the proportional flow rate is zero.

U.S. Pat. No. 5,350,512 to Tang, issued on Sep. 27, 1994, discloses an apparatus for treatment of wastewater. This invention is virtually identical to U.S. Pat. No. 5,405,540 issued to Tang, discussed in the proceeding paragraph. However, what is claimed in this invention is the apparatus as opposed to the method.

U.S. Pat. No. 6,298,871 to Pickens et al., issued on Oct. 9, 2001, discloses a chemical feeder. The feeder may be placed in a piping system. A connection for an inlet and outlet are provided. A liquid fluid enters the feeder. A predetermined flow pattern is designed within the feeder. The fluid flows across a liquid-soluble chemical. A portion of the chemical is dissolved. The chemical containing fluid exits the feeder. In this invention, there is a full flow of liquid across the solid chemical, whereas the present invention only requires a proportional flow of the fluid across the solid chemical. In addition, the feeder of Pickens et al. is designed for a flow rate between 0.2 and 10 gallons per minute. The present invention is designed for much greater flow rates, such as those flow rates that are required by the National Fire Protection Association for testing fire pumps and fire flow testing for fire mains, as well as main flushing requirements (for debris removal) as recommended by the American Water Works Association. In addition, the present invention can be valved off such that there is no flow across the treating agent when no treating agent is required, without requiring the removal of the solid chemical. This allows for conservation of the treating agent itself.

U.S. Pat. No. 6,221,257 to Grim, issued on Apr. 24, 2001, discloses a fluid treating apparatus. A reaction container containing a treating agent is inserted into the apparatus. Unlike the present invention, the Grim invention operates by directing the full stream of the fluid flow across the container. As discussed above, the present invention can be valved off such that there is no flow across the chemicals when no chemicals are required without requiring the removal of the solid chemical. Additionally, the present invention only requires a proportional flow when operating.

U.S. Pat. No. 6,138,703 to Ferguson et al., issued on Oct. 31, 2000, discloses a chemical feeder. The feeder has a single opening in the base where it is connected to a fluid flow. In order for fluid to enter the feeder, pressure in the fluid stream must be greater than the pressure in the feeder. The present invention utilizes an inlet and an outlet, thereby diverting proportional fluid flow through the dechlorination agent reservoir. In addition, the device in the present invention can operate at any system pressure as long as there is pressure attributed to velocity head, which will create fluid diversion attributed by the design of the device, and the system pressure does not exceed safety ratings.

U.S. Pat. No. 6,264,846 to Smith, issued on Jul. 31, 2001, discloses a system for processing water by mixing the water with an additive. Fluid flows through a by-pass where a chemical is injected into the fluid. To motivate flow through the by-pass, a restriction that causes a pressure drop in the main flow, thereby forcing flow through the by-pass, is placed in the main flow of the fluid. The present invention does not require a restricting device to divert flow through the by-pass, nor does the present invention obstruct the flow-path as the '846 patent does. Therefore, there is less energy consumption of the pump and more control over any test equipment. In addition, the present invention does not require a device to inject the chemical into the fluid.

OBJECTS OF THE INVENTION

An object of the present invention is to provide a novel and improved device for adding chemicals, particularly a dechlorination agent, to a fluid flow path.

Another object of the invention is to provide a chemical adding device that is portable and easily transported to an area where its use is required.

Another object of the invention is to provide a device that can easily be attached to other in-line fluid flow devices that are ordinarily used in fluid flow operations.

Another object of the invention is to provide a device where only a controllable proportion of the flow is required to pass through the chemical containing area such that the rate of chemical added to the fluid stream can be controlled locally.

Yet another object of the invention is to provide dechlorination with minimal energy consumption and resulting flow rate reduction due to friction loss.

Numerous other objects, features and advantages of the present invention will become readily apparent through the detailed description of the preferred embodiment, drawings and the claims.

SUMMARY OF THE INVENTION

The present invention comprises a novel device for delivering chemicals to a fluid flow system. In the preferred embodiment, the device is connected to a system that contains chlorinated fluid, such as water, that requires dechlorination. In order to achieve the desired goals, the present invention adds a dechlorination agent to the fluid stream. The device may be manufactured to fit or connect to various types of connections, such as female and male, swivel, threaded, soldered, as may be required by the user.

The preferred embodiment of the device comprises a flow tube, a by-pass and a dechlorination reservoir. The flow tube comprises a flow pipe, an inlet coupling and an outlet coupling. The flow pipe further comprises an inlet tube opening, a pipe and an outlet tube opening. The by-pass comprises an inlet diverter, an inlet tube, a reservoir connecting or mounting tube, an outlet tube, an outlet converter and an injection rate control valve. The dechlorination agent reservoir comprises an untreated fluid inlet, an agent mixing chamber and a treated fluid outlet. The dechlorination agent reservoir may optionally further comprise a screen, although a screen is not required in the preferred embodiment of the invention.

In the preferred embodiment, the device may be connected to a fluid flow system via said inlet coupling. The fluid will flow through the fluid flow system and the device. The water flow travels through the inlet coupling into a flow tube containing a flow pipe. The water flow then travels through the flow pipe into a by-pass via an inlet diverter, and then into an inlet tube and a reservoir connecting or mounting tube that is connected to a dechlorination agent reservoir, where a dechlorinating agent is added to the water stream. The water flow passes through an untreated fluid inlet into the dechlorination agent reservoir where it is treated in an agent mixing chamber, from which it passes through an optional screen and then travels out of the reservoir through a treated fluid outlet. The dechlorinated, treated water then travels out of the by-pass through an outlet tube and outlet converter, back into the main stream in the flow pipe and out of the flow tube through an outlet coupling.

Additionally, the preferred embodiment may include a valve installed in the by-pass, such that if no dechlorination agent is required, the valve can be closed and no water is diverted through the by-pass. Hence, the amount of water flowing through the bypass can be controlled. Additionally, the bypass valve may be mounted anywhere along the by-pass, such as on either the inlet, or the outlet side of the by-pass as determined by the manufacturer.

A controlled amount of the water may be diverted, as required, such that a proportion passes through the dechlorination reservoir. The dechlorination reservoir contains a dechlorination agent, which is fluid-soluble. The dechlorination agent containing fluid then enters the main stream, mixing with the remainder of the total stream.

The injection rate of dechlorinating agent added to the fluid stream, can be controlled by a valve mounted to the bypass of the invention. Therefore, only as much dechlorinating agent as is needed for a specific operation will be used. However, the dechlorinating agent can be available as needed.

Once the total stream has passed through the device and the required amount of dechlorination agent has been added to the stream, the water may be discharged to the environment.

Because of the low profile of the intake tube inserted into the flow stream, the device has a low friction loss. Also, this low profile keeps the flow path unobstructed, ensuring a more accurate flow rate measurement, lower energy losses, and less chance of damage from suspended solids in the flow stream.

Although the shape and position of the flow tube, the reservoir and the by-pass, as well as the position and angle of the inlet and outlet tubes, and the shape, position and material of the by-pass may vary, in the preferred embodiment of the invention, the inlet tube may be positioned on an opposite side of the fluid flow from the outlet tube with each of the inlet tube and outlet tubes angled at approximately a forty-five degree angle relative to the water flow. Although the particular angle of the inlet and/or outlet tube may vary, positioning of the inlet and outlet tubes at an angle facilitates more efficient water flow by decreasing friction and energy loss and allowing a greater of amount of water to pass through. The inlet and outlet tube may each be connected to the mixing reservoir via a reservoir connecting tube, which may be made of flexible tubing, which also facilitates efficient water flow by avoiding severe changes in direction, friction and energy loss and allows the mixing reservoir to be positioned as needed.

In an alternate preferred embodiment of the invention, the inlet and outlet tubes may be positioned either on the same or opposite sides of the water tank, may be perpendicular, rather than angled, relative to the fluid flow, and may have straight, rather than angled, ends. The inlet and outlet tubes are each connected to the mixing reservoir via a reservoir mounting tube, which may be made of hard piping. The dechlorinating agent reservoir may further comprise a treatment cylinder, a screen and an outlet cylinder.

DESCRIPTION OF THE DRAWINGS

A preferred embodiment of the present invention is described herein with reference to the drawing wherein.

DETAILED DESCRIPTION OF THE PREFERRED EMBODIMENT

Figure 1:
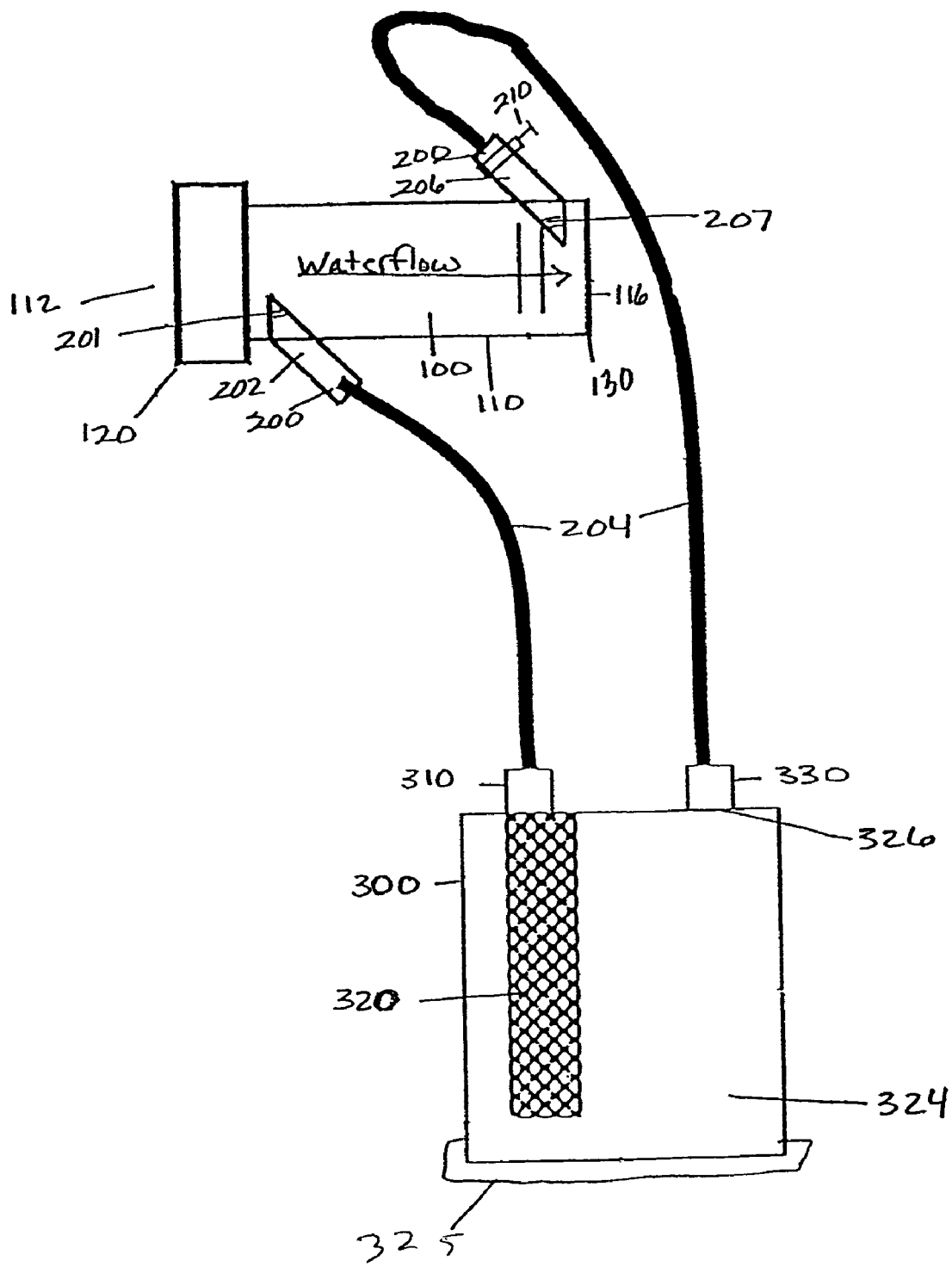
FIG. 1 is a side elevation view of the preferred embodiment of the dechlorination device.

While the invention is susceptible of various modifications and alternative constructions, certain illustrated embodiments shown in the drawings will be described below in detail. It should be understood, however, that there is no intention to limit the invention to the specific forms disclosed, but on the contrary, the invention is to cover all modifications, alternatives constructions and equivalents falling within the spirit and scope of the invention.

Referring to FIG. 1, a preferred embodiment of the present invention 10 contains a flow tube 100, a by-pass 200, and a dechlorination agent reservoir 300. The flow tube 100 comprises a flow pipe 110, an inlet coupling 120, and an outlet coupling 130. The flow pipe 110 further comprises an inlet opening 112 and an outlet opening 116. The by-pass 200 comprises an inlet tube 202, a reservoir connecting or mounting tube 204, an outlet tube 206, and an injection rate control valve 210. Inlet tube 202 and outlet tube 206 are each affixed in the flow pipe 110, in any suitable manner. The inlet tube 202 further comprises an inlet diverter 201. The outlet tube 204 further comprises an outlet converter 207. While valve 210 is shown on outlet tube 206, it could be located anywhere in by-pass 200 or the reservoir 300, such as on tubes 202 or 204. Multiple valves may also be used along the by-pass. The dechlorinating reservoir 300 comprises an untreated fluid inlet 310, an inflow directing tube 320, an agent mixing chamber 324, and a treated fluid outlet 330. The treated fluid outlet may further comprise a screen 326, although a screen is not required in the preferred embodiment of the present invention because the inflow directing tube allows the agent to mix thoroughly with the fluid without "caking" at the bottom of the tank.

Figure 2:
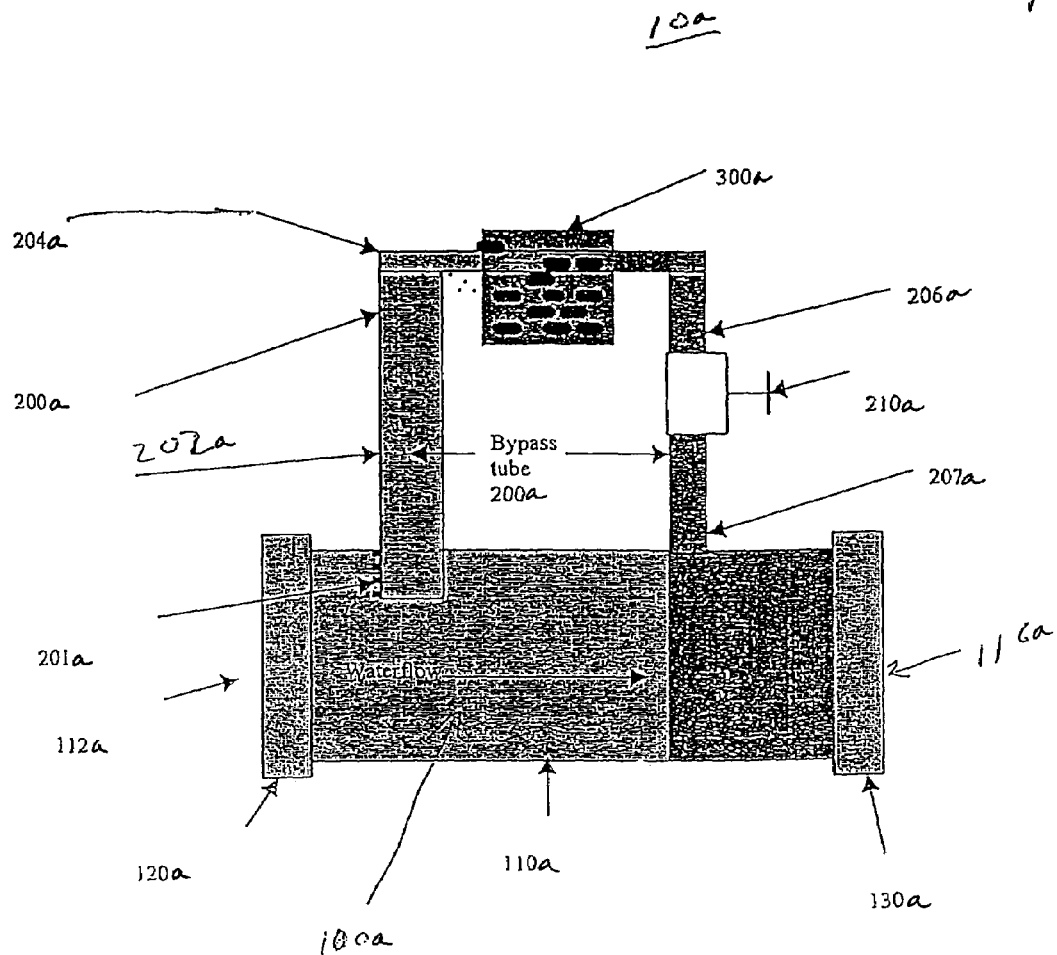
FIG. 2 is a side elevation view of an alternate embodiment of the dechlorination device.

Although the inlet and outlet tubes 202, 206 of the by-pass 200 are shown in FIG. 1 as being on opposite sides of the fluid flow and positioned with their central axes at approximately a forty-five degree angle to the fluid flow and a central axis of the flow tube, with the inlet tube 202 being angled toward the direction of the fluid flow and the inlet coupling 120 and the outlet tube 206 being angled away from the fluid flow or toward the outlet opening 116, as is preferred, the by-pass 200 may be of any design. Further, the inlet and outlet tubes 202, 206 may be positioned anywhere along the flow tube 100 and at any angle relative to the fluid flow, such as the example shown in FIG. 2. In addition, the inlet tube diverter 201a and outlet tube converter 207a may be of any design. As illustrated in FIG. 1, the inlet tube diverter 201 and outlet tube converter 207 have angled ends set perpendicular to the fluid flow with their inlets in the angled ends. As illustrated in FIG. 2, the inlet tube diverter 201 and outlet tube converter 207 have straight ends set perpendicular to the fluid flow with their inlets in the side of the inlet and outlet tubes 202a, 206. Similarly, the dechlorinating agent reservoir 300a and its untreated fluid inlet 310a, treatment cylinder 320a, access cap 325, and treated fluid outlet 320a may be of any design or shape and may be positioned anywhere, as illustrated by the various designs and positions in FIGS. 1, 3 and 4.

Referring to FIG. 2, an alternate preferred embodiment of the present invention 10a contains a flow tube 100a, a by-pass 200a, and a dechlorination agent reservoir 300a. The flow tube 100a comprises a flow pipe 110a, an inlet coupling 120a, and an outlet coupling 130a. The flow pipe 110a further comprises an inlet opening 112a and an outlet opening 116a. The by-pass 200a comprises an inlet tube 202a, a reservoir connecting or mounting tube 204a, an outlet tube 206a, and an injection rate control valve 210a. Inlet tube 202a and outlet tube 206a are each affixed in the flow pipe 110a, in any suitable manner. The inlet tube 202a further comprises an inlet diverter 201a. The outlet tube 204a further comprises an outlet converter 207a. While valve 210a is shown on outlet tube 206a, it could be located anywhere in by-pass 200a or the reservoir 300a, such as on tubes 202a or 204a.

Figure 3:
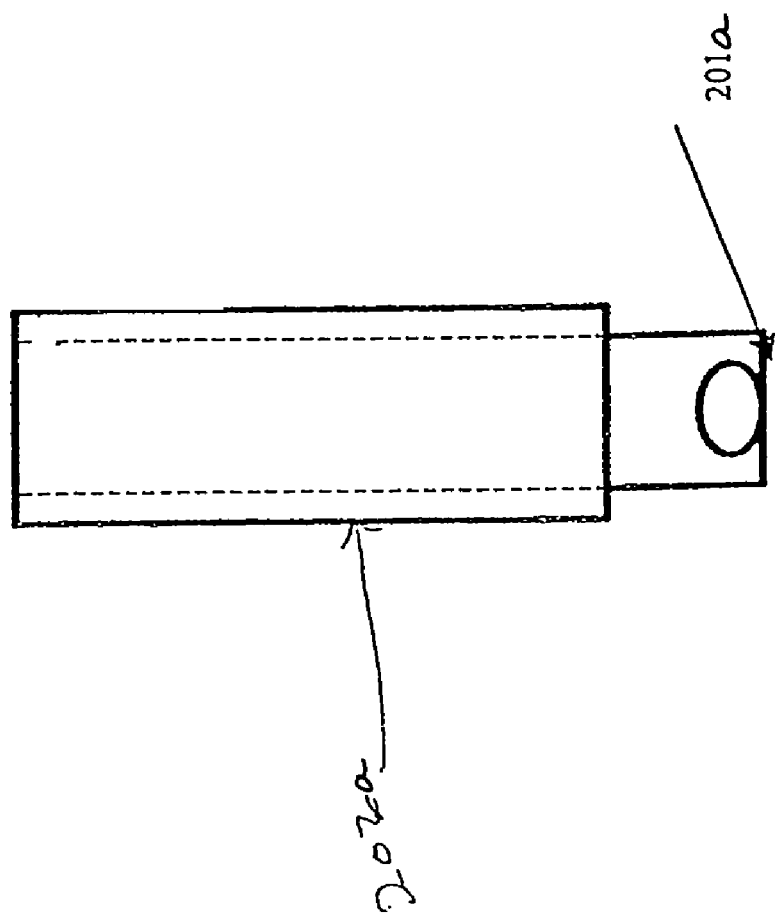
FIG. 3 is a front elevation view of the inlet tube of the alternate embodiment.

FIG. 3 displays a diagram of inlet tube 202a. The inlet of inlet diverter 201a faces the direction from which the fluid is flowing, allowing water to enter by-pass 200a when valve 210a is open.

Figure 4:
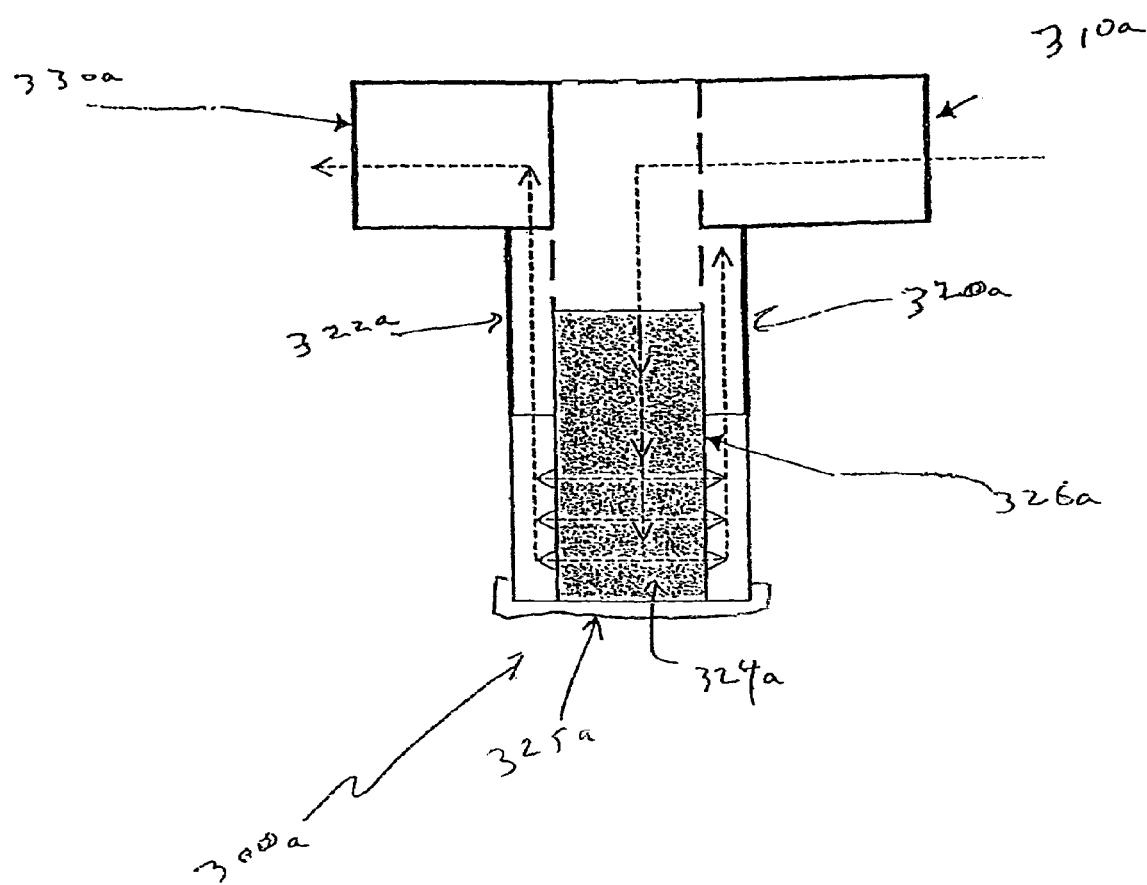
FIG. 4 is a front elevation view of the dechlorination agent reservoir of the alternate embodiment.

Referring to FIG. 4, the dechlorination agent reservoir 300a comprises an untreated fluid inlet 310a, a treatment cylinder 320a, and a treated fluid outlet 330a. The treatment cylinder 320a further comprises an outlet cylinder 322a, an agent mixing chamber 324a, and a screen 326a.

In operation, an operator will connect the inlet coupling 120 or 120a to a fluid flow system such as a fire hydrant, pump test header, hose or piping system from which water flows. The operator will connect the outlet coupling 130 or 130a to a hose, flow device, diffuser, diverter or to the open atmosphere. Water flow will be supplied to the device through the inlet coupling 120 or 120a.

As water enters the device, the water will travel through the flow pipe 110 or 110a. A desired amount of water can be diverted through the bypass 200 or 200a by opening the injection rate control valve 210 or 210a. That portion of the water entering the inlet diverter 201 or 201a, will travel through inlet tube 202 or 202a, through the reservoir mounting or connecting tube 204 or 204a, through the dechlorination agent reservoir 300 or 300a, through the outlet tube 206 or 206a, through the injection rate control valve 210 or 210a, and exit the by-pass 200 or 200a through the outlet converter 207 or 207a. The by-passed water will join and mix with the water that traveled through the flow pipe 100 or 100a. The total flow will then exit the device through the outlet coupling 130 or 130a.

When a dechlorination agent is required, valve 210 or 210a will be opened partially or fully to add the appropriate quantity of dechlorination agent. When a dechlorination agent is not required, valve 210 or 210a will be in the closed position. The valve 210 or 210a may be in any position in between for a reduced amount of flow through the by-pass 200 or 200a as required for proper dechlorination.

Although the dechlorinating agent reservoir is illustrated schematically in FIGS. 1 and 2 as being square or rectangular in shape and in FIG. 4 as being T-shaped, the reservoir is not limited to any particular shape or design. Water passing through dechlorination agent reservoir 300 or 300a enters inlet 310 or 310a, and flows into inflow directing tube 320 (FIG. 1) or treatment cylinder 320a (FIG. 4). Therein, the untreated water enters agent mixing chamber 324 or 324a and is exposed to the dechlorination agent contained therein. The now treated fluid exits the agent mixing chamber 324 or 324a through the screen 326 (optional, in FIG. 1) or 326a (FIG. 4). In FIG. 1, the treated fluid is sealed off from inlet 310 and exits through outlet 330, thus allowing the treated water to flow into outlet 330 while preventing the treatment water from entering inlet 310. In FIG. 4, the treated fluid enters the outlet cylinder 322a, which is in fluid communication with outlet 330a, but is sealed off from inlet 310a, thus allowing the treated water to flow into outlet 330a while preventing the treatment water from entering inlet 310a.

The agent mixing chamber 324 or 324a is preferably removable and replaceable from the dechlorination device, and may be removed without removing the dechlorination device from the fluid flow path. The dechlorinating agent may be any liquid soluble including tablets, powder or as may be preferred by the user.

The invention easily attaches to other in-line devices that do not have dechlorination abilities. It can attach directly to a hydrant or in-line with virtually any flow device, or it can be used as a discharge device connected directly to the source of the water to be discharged, such as a fire hydrant. An operator will connect the device in a fluid flow system, such as a piping system, hydrant or discharge hose. Additionally, it can be used in conjunction with other devices that are normally used during fluid operations, such as diffusers, diverters and flow measuring devices as well as with fire hoses that would otherwise connect directly to a hydrant.

It should be understood that the embodiments herein described are merely illustrative of the principles of the present invitation. Various modifications may be made by those skilled in the art without departing from the spirit or scope of the claims which follow. Other modifications or substitutions with equivalent elements are also contemplated.

What is claimed is:

1. A device for dechlorinating water comprising:
    a flow tube surrounding a central axis and defining an inlet coupling at one end and an outlet opening at the other end, said inlet coupling being adapted to be connected to a fluid flow system;
    an outlet tube extending from an exterior to an interior of the flow tube, wherein a central axis of said outlet tube is angled at approximately 45 degrees to the central axis of the flow tube in a direction toward the inlet coupling, said outlet tube having an outlet end disposed within the interior of the flow tube that is perpendicular to the central axis of the flow tube and faces the inlet coupling;
    an inlet tube extending from the exterior to the interior of the flow tube, wherein a central axis of the inlet tube is angled at approximately 45 degrees to a central axis of the flow tube in a direction toward the outlet end of the flow tube, said inlet tube having an inlet end disposed within the interior of the flow tube that is perpendicular to the central axis of the flow tube and faces the outlet opening of the flow tube;
    an injection rate control valve disposed on said inlet tube for controlling flow through said inlet tube;
    a dechlorinating agent reservoir containing a quantity of a dechlorinating agent, said reservoir including an untreated water inlet and a treated water outlet;
    a first reservoir tube for connecting the outlet tube to the untreated water inlet of the reservoir; and
    a second reservoir tube for connecting the treated water outlet of the reservoir to the inlet tube.

2. A method of dechlorinating water comprising the steps of:
    providing the device of claim 1;
    coupling the inlet coupling to the fluid flow system;
    flowing chlorinated water into the inlet coupling, through the flow tube, and out of the outlet opening;
    diverting a portion of the chlorinated water into the inlet of the dechlorinating agent reservoir via the inlet tube and first reservoir tube;
    mixing said portion with the dechlorinating agent;
    returning said portion to the flow tube via the second reservoir tube and inlet tube to dechlorinate the flow of chlorinated fluid flowing through said flow tube; and
    adjusting a flow rate through the inlet tube with said injection rate control valve.

* * * * *